United States Patent Office 3,442,951
Patented May 6, 1969

3,442,951
PROCESS FOR MANUFACTURING N-METHYLBUTYLAMINE
Pierre Thirion, La Chambre, France, assignor to Ugine Kuhlmann, Paris, France, a French company
No Drawing. Filed Mar. 27, 1967, Ser. No. 625,977
Claims priority, application France, Mar. 31, 1966, 55,755
Int. Cl. C07c 87/02
U.S. Cl. 260—583    9 Claims

ABSTRACT OF THE DISCLOSURE

N-methylbutylamine is prepared by feeding continuously butanal into an aqueous or a hydroalcoholic sodium hydroxide solution in a hydrogen atmosphere and at a temperature in the range between about 20° and 200° C. The solution contains about 0.25 to 5 moles of monomethylamine per mole of water and a catalytic amount of a hydrogenating catalyst.

BACKGROUND OF THE INVENTION

Field of the invention

This invention relates to a process for manufacturing N-methylbutylamine.

Description of the prior art

N-methylbutylamine can be prepared by reacting monomethylamine, butanal and hydrogen in the presence of a hydrogenating catalyst in accordance with the following reaction:

$$CH_3NH_2 + C_3H_7CHO + H_2 \rightarrow CH_3NHC_4H_9 + H_2O$$

In carrying out this process, the carbonyl compound and the primary amine are introduced into an autoclave wherein the resultant mixture is subjected to a catalytic hydrogenation under a temperature and a pressure which allows the reaction to proceed at a sufficiently high rate. The reaction may take place either with or without a solvent. Using this technique, the yields are generally poor.

Th low yields of this process may be contributed by the formation of side-products because aldehydes and ketones, especially aldehydes, have a strong tendency to undergo self-condensation to form undesirable side-products in the presence of strongly basic compounds such as the primary amine. For example, in manufacturing N-methbutylamine, the butanal can be caused to form 2-ethyl-1-hexanal or 2-ethyl-1-hexanol according to the following equations:

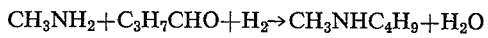

$$2C_3H_7CHO + H_2 \longrightarrow C_4H_9-\underset{C_2H_5}{\underset{|}{CH}}-CHO + H_2O$$

$$2C_3H_7CHO + 2H_2 \longrightarrow C_4H_9-\underset{C_2H_5}{\underset{|}{CH}}-CH_2OH + H_2O$$

The carbonyl side-products produced by the condensations of the aldehydes or the ketones at the beginning stage of the reaction may in turn react with the primary amine to form secondary amines. For example, the 2-ethyl-1-hexanal produced according to one of the equations stated hereinabove, may react with momomethylamine and hydrogen to produce 1-methylamine-2-ethylhexane according to the following reaction:

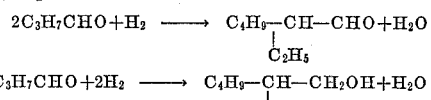

$$CH_3NH_2 + C_4H_9-\underset{C_2H_5}{\underset{|}{CH}}-CHO + H_2 \longrightarrow$$

$$CH_3-NH-CH_2-\underset{C_2H_5}{\underset{|}{CH}}-C_4H_9 + H_2O$$

The aldehydes and the ketones will also react with secondary amines to produce tertiary amines. In the manufacture of N-methylbutylamine, a secondary amine, the reaction of the aldehyde and the newly formed N-methylbutylamine is the primary cause for the large loss of yield. The reaction for the formation of the tertiary amine, N-methyldibutylamine, may be depicted as follows:

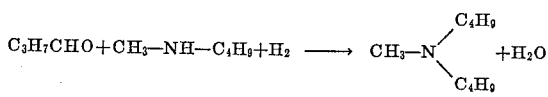

$$C_3H_7CHO + CH_3-NH-C_4H_9 + H_2 \longrightarrow CH_3-N\underset{\diagdown C_4H_9}{\diagup C_4H_9} + H_2O$$

In the manufacture of N-mehylbutylamine, there is still another side reaction of significance which involves the reaction of the aldehyde and a secondary amine, dimethylamine. The latter is an impurity in amounts of the order of 0.5% by weight in commercial grade monomethylamine used as a starting material for the manufacture of N-methylbutylamine. The reaction for the formation of the tertiary amine, N-dimethylbutylamine may be represented by the following equation:

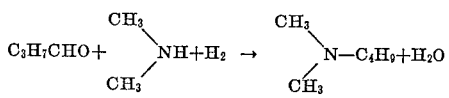

$$C_3H_7CHO + \underset{CH_3}{\overset{CH_3}{\diagdown}}NH + H_2 \rightarrow \underset{CH_3}{\overset{CH_3}{\diagdown}}N-C_4H_9 + H_2O$$

The presence of N-dimethylbutylamine has adverse affects on the quality of N-methylbutylamine and cannot be separated from the latter readily because the difference in the boiling points of the two compounds at atmospheric pressure is small, i.e. 93° C. and 91° C. respectively.

To limit the self-condensation of the aldehydes and ketones, it has been proposed to feed continuously the carbonyl compound into the reaction medium so as to limit its stationary concentration therein. This technique, however, is not completely adequate because is fails to prevent the formation of the tertiary amines, the prime factor for causing loss of yields.

Attempts have been made to limit the formation of tertiary amines in the manufacture of N-methylbutylamine by using a large excess amount of primary amine with reference to the amounts of carbonyl compound used. This technique, however, has significant disadvantages because large amounts of thermal energy and considerable amounts of time must be used to recover the product from the reaction medium by distilling off the large amounts of primary amine. The large amount of primary amine used will also necessarily limit the output capacity of a given size reactor and cause the loss of selectivity.

Attempts have also been made to conduct the reaction in alcoholic or hydroalcoholic mixtures. Although the problems related to homogenization and to putting into solution immiscible phases, may have been solved or partially solved, this technique has not satisfactorily overcome the problems and limitations imposed by the secondary reactions described hereinabove.

SUMMARY OF THE INVENTION

I have found that it is possible to surmount effectively the disadvantages of the prior processes for the manufacture of N-methylbutylamine described hereinabove, by the process of this invention. Broadly stated, the invention comprises feeding gradually butanal into an aqueous or a hydroalcoholic sodium hydroxide solution in a hydrogen atmosphere and at a temperature in the range between about 20° C. and 200° C. The solution contains about 0.25 to 5 moles of momomethylamine per mole of water and a catalytic amount of a hydrogenating catalyst. The N-methylbutylamine thus produced is then recovered from the reaction medium.

Contrary to expectations, by carrying out the reaction in the presence of water and of sodium hydroxide, according to the present invention, the formation of tertiary amines, i.e., N-dimethylbutylamine and N-methyldibutylamine, is practically completely inhibited. This result is achieved without increasing to any degree the risk of self-condensation of butanal.

DESCRIPTION OF THE PREFERRED EMBODIMENTS

The reaction may be carried out in the aqueous or hydroalcoholic sodium hydroxide solution of any concentration. I found that yields are better if the amount of sodium hydroxide in the solution is between 0.1% and 10% by weight. The best results are usually obtained using a concentration of 1% to 3% by weight of sodium hydroxide solution.

The molar ratio of water to monomethylamine is maintained, as stated hereinabove, generally in the range between 0.25 and 5. However, it is preferred that the ratio be in the range between 1 and 2.

The amount of butanal to be used in the reaction may vary within a wide range. It is generally preferred that not more than the stoichiometric amount be used. I found a molar ratio of monomethylamine to butanal in the range of 1 and 1.5 to be eminently suitable and an optimum ratio in the vicinity of 1.1. The butanal is to be fed into the reaction medium gradually and preferably continuously so the stationary concentration of butanal in the reaction medium is relatively low. The rate is governed generally by the reaction conditions and particularly by the reaction rate. It should not be so high as to cause large accumulations of butanal nor so low as to increase unduly the reaction time.

The reaction may be carried out in a wide temperature range of 20 to 200° C. It is preferred, however, that the reaction temperature be in the neighborhood of about 100° C. The hydrogen pressure maintained in the reaction vessel, such as an autoclave, can also be varied within a wide range of 1 to 100 bars, however pressure in the vicinity of 30 bars is preferred.

The hydrogenation may be effected with any suitable catalyst. A large number of such catalysts are known. I found Raney nickel, whose catalytic activity and durability in an alkaline medium are exceptionally good, to be particularly suitable.

It is understood that the term "N-methylbutylamine" covers all the isomers.

Further to illustrate this invention, specific examples are described hereinbelow.

EXAMPLE I

In this example, a small quantity of sodium hydroxide was employed. The following materials were introduced into a horizontal autoclave of stainless steel having a capacity of 5 cubic decimeters, the autoclave being provided with a reciprocating mixing device moving in a direction perpendicular to the axis of the autoclave:

100 grams of Raney nickel
620 grams (20 moles) of monomethylamine
485 grams of an aqueous solution of 0.02% of pure sodium hydroxide by weight Consequently, the molar ratio of water to monomethylamine was 1.34.

The temperature was raised to 100° C. and the pressure of hydrogen was raised to a value varying between 40 and 50 bars, thereafter 16 moles or 1153.6 grams of butanal were injected thereinto at the rate of from 233 to 253 grams per hour. Under these conditions, the molar ratio of monomethylamine to butanal was 1.25. The reaction lasted for about 5 hours.

After cooling, the content of the autoclave was analyzed and the following results were obtained:

| | Percent |
|---|---|
| Extent of conversion of the butanal | 100 |
| Yields in N-methylbutylamine | 79.8 |
| Yield in normal butanol | 0.83 |
| Yields of side-products not of commercially exploitable equality and quantity and comprising essentially N-dimethylbutylamine and N-methyldibutylamine | 19.3 |

EXAMPLE II 100 grams of Raney nickel, 20 moles or 620 grams of monomethylamine and 493 grams of an aqueous sodium hydroxide solution containing 1.62% by weight of NaOH were introduced into the same autoclave used in Example I. The molar ratio of water to monomethylamine was 1.34. After the addition, the temperature was raised to 100° C. and the hydrogen pressure was raised to 30 bars, whereupon 16 moles or 1153.6 grams of butanal were injected into the autoclave at the rate of from 233 to 253 grams per hour. Under these conditions, the molar ratio of monomethylamine to butanal was 1.25. The reaction took place over a period of 5 hours.

After cooling, the content of the autoclave was analyzed and the following results were obtained:

| | Percent |
|---|---|
| Extent of conversion of the butanal | 100 |
| Yield in N-methylbutylamine | 96.9 |
| Yield of normal butanol | 1.63 |
| Yield in non-exploitable side-products primarily comprising N-methyldibutylamine | 1.38 |

By comparison with Example I, the increase in yield of N-methylbutylamine amounts in relative terms to 21.4% and the N-dimethylbutylamine has practically disappeared.

EXAMPLE III

With the same appaartus as that described in the preceding examples, another test was carried out under conditions identical with those of Example II, except that the weight percentage of NaOH in the aqueous sodium hydroxide solution was raised to 3% by weight. After cooling, the contents of the autoclave were analyzed and the following results were obtained:

| | Percent |
|---|---|
| Extent of conversion of the butanal | 100 |
| Yield in N-methylethylamine | 97.1 |
| Yield in normal butanol | 2.11 |
| Yield in non-exploitable side-products constituted essentially of N-methyldibutylamine | 0.7 |

By comparison with Example I, the increased yield in N-methylbutylamine was therefore in relative terms 21.7% and the formation of N-dimethylbutylamine was completely inhibited.

EXAMPLE IV

With the same apparatus as that described in the preceding examples, a further test was carried out under conditions identical with those set forth in Example II except that the molar ratio of monomethylamine to butanal was equal to unity.

After cooling, the contents of the autoclave were analyzed and the following results were obtained:

| | Percent |
|---|---|
| Extent of conversion of the butanal | 100 |
| Yield in N-methylbutylamine | 94.4 |
| Yield in normal butanol | 2.85 |
| Yield in non-exploitable side products comprising essentially N-methyldibutylamine | 2.58 |

By comparison with Example I, the increase in the yield of N-methylbutylamine was thus in relative terms 18.3% and the formation of N-dimethylbutylamine was practically eliminated.

I claim:

1. A process for manufactuding N-methylbutylamine which comprises gradually feeding butanal into an aqueous or a hydroalcoholic sodium hydroxide solution in a hydrogen atmosphere and at a temperature in the range between about 20° C. and 200° C., said solution containing about 0.25 to 5 moles of monomethylamine per mole of water and a catalytic amount of a hydrogenating catalyst, and recovering the N-methylbutylamine therefrom.

2. A process according to claim 1 wherein the solution has about 0.1% to 10% by weight of sodium hydroxide.

3. A process according to claim 2 wherein the amount of monomethylamine in the solution is about 1 to 2 moles per mole of water in the solution.

4. A process according to claim 2 wherein the hydrogen atmosphere has a pressure in the range between 1 and 100 bars.

5. A process according to claim 2 wherein the butanal fed into the solution is equivalent to a molar ratio of butanal to monomethylamine of about 1 to 1.5.

6. A process for manufacturing N-methylbutylamine which comprises feeding continuously not more than a stoichiometric amount of butanal into a 1% to 3% by weight of aqueous or hydroalcoholic sodium hydroxide solution in a superatmospheric hydrogen atmosphere and at a temperature in the range between 20° C. and 200° C., said solution containing about 1 and 2 moles of monomethylamine per mole of water and a catalytic amount of hydrogenating catalyst, and recovering the N-methylbutylamine therefrom.

7. A process according to claim 6 wherein the butanal fed into the solution is equivalent to a molar ratio of monomethylamine to butanal of about 1 to 1.5.

8. A process according to claim 6 wherein the molar ratio of monomethylamine to butanal is about 1.1, the hydrogen pressure is maintained at about 30 bars and the temperature is at about 100° C.

9. A process according to claim 8 wherein the catalyst is Raney nickel.

References Cited
UNITED STATES PATENTS 2,809,995  10/1957  Noeske _____ 260—583
2,828,343  3/1958  Tindall _____ 260—570.8

CHARLES B. PARKER, *Primary Examiner.*

R. L. RAYMOND, *Assistant Examiner.*